United States Patent
Timko et al.

(10) Patent No.: US 6,839,614 B1
(45) Date of Patent: Jan. 4, 2005

(54) MULTI-MODE IN-VEHICLE CONTROL UNIT WITH NETWORK SELECTIVITY FOR TRANSMITTING VEHICLE DATA FOR FLEET MANAGEMENT

(75) Inventors: Jerry R. Timko, Lilburn, GA (US); Marvin R. Hamrick, Watkinsville, GA (US)

(73) Assignee: Bellsouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/988,304

(22) Filed: Nov. 19, 2001

Related U.S. Application Data

(63) Continuation-in-part of application No. 09/474,368, filed on Dec. 29, 1999, now Pat. No. 6,356,841.

(51) Int. Cl.[7] .............................................. G06F 19/00
(52) U.S. Cl. ......................... 701/1; 370/349; 370/319; 340/459; 340/425.5; 455/12.1; 455/427; 455/519
(58) Field of Search ................... 370/349, 315, 370/316, 319, 321; 340/459, 425.5, 438, 825.28, 825.491; 455/12.1, 427, 428, 432, 519, 518, 422, 445, 558, 412, 414, 424, 517; 701/1; 379/59, 58

(56) References Cited

U.S. PATENT DOCUMENTS

| | | | |
|---|---|---|---|
| 5,014,206 A | | 5/1991 | Scribner et al. ............ 342/457 |
| 5,223,844 A | | 6/1993 | Mansell et al. ............ 342/357 |
| 5,400,018 A | * | 3/1995 | Scholl et al. .......... 340/825.54 |
| 5,544,225 A | * | 8/1996 | Kenney, III et al. ......... 379/59 |
| 5,557,254 A | * | 9/1996 | Johnson et al. ............. 340/426 |
| 5,652,707 A | * | 7/1997 | Wortham .................... 340/990 |
| 5,732,074 A | * | 3/1998 | Spaur et al. ................ 370/313 |
| 5,734,981 A | * | 3/1998 | Kennedy, III et al. ...... 455/445 |
| 5,945,919 A | * | 8/1999 | Trask .................. 340/825.491 |
| 5,953,319 A | * | 9/1999 | Dutta et al. ................. 370/238 |
| 5,986,543 A | | 11/1999 | Johnson ..................... 340/426 |
| 5,987,377 A | | 11/1999 | Westerlage et al. ......... 701/204 |
| 6,006,148 A | * | 12/1999 | Strong ......................... 701/33 |
| 6,028,514 A | | 2/2000 | Lemelson, et al. .......... 340/539 |
| 6,084,870 A | * | 7/2000 | Wooten et al. .............. 370/349 |
| 6,087,965 A | | 7/2000 | Murphy ...................... 340/991 |
| 6,111,540 A | | 8/2000 | Krasner .................. 342/357.1 |
| 6,133,873 A | | 10/2000 | Krasner .................. 342/357.12 |
| 6,148,202 A | | 11/2000 | Wortham .................... 455/434 |
| 6,181,995 B1 | | 1/2001 | Luper et al. .................. 701/35 |
| 6,272,315 B1 | * | 8/2001 | Chang et al. .............. 455/13.1 |
| 6,278,921 B1 | * | 8/2001 | Harrison et al. .............. 701/35 |
| 6,278,936 B1 | * | 8/2001 | Jones ......................... 701/201 |
| 6,295,449 B1 | * | 9/2001 | Westerlage et al. ......... 455/422 |
| 6,301,480 B1 | * | 10/2001 | Kenney, III et al. ......... 455/445 |
| 6,343,220 B1 | * | 1/2002 | Van Der Salm ............ 455/552 |
| 6,362,730 B2 | * | 3/2002 | Razavi et al. ............... 340/438 |
| 6,430,496 B1 | * | 8/2002 | Smith et al. ................. 701/117 |
| 2001/0033225 A1 | * | 10/2001 | Razavi et al. ............. 340/425.5 |

* cited by examiner

*Primary Examiner*—Thomas G. Black
*Assistant Examiner*—Tuan C To
(74) *Attorney, Agent, or Firm*—Merchant & Gould

(57) ABSTRACT

A multi-mode in-vehicle control unit (ICU) contains a plurality of modems. Each modem allows the multi-mode ICU to transmit vehicle data over a different kind of transmission network. Exemplary transmission networks include wireless data networks, cellular telephone networks and satellite networks. Vehicle data is collected. The multi-mode ICU selects one of the modems for transmission of vehicle data to a processing center. Priorities can be assigned to the transmission networks and or modems to control order the transmission network selection process.

21 Claims, 3 Drawing Sheets

MULTI-MODE IN-VEHICLE CONTROL UNIT WITH NETWORK SELECTIVITY FOR TRANSMITTING VEHICLE DATA FOR FLEET MANAGEMENT

This application is a continuation-in-part of U.S. application Ser. No. 09/474,368, filed Dec. 29, 1999, now U.S. Pat. No. 6,356,841 (the "'368 Application"), which is hereby incorporated by reference in its entirety.

BACKGROUND

1. Field of the Invention

The present invention relates generally to systems that manage fleets of vehicles. More particularly, the present invention relates to a multi-mode in-vehicle control unit for transmitting vehicle data to a processing center to support fleet management functions.

2. Background of the Invention

Many companies use a fleet of vehicles to transport personnel, equipment and/or packages to a particular destinations. For example, companies in service industries have a fleet of vehicles to carry service technicians and equipment to customer locations in response to service requests or reports of service disruption received from customers. Delivery companies such as Federal Express, UPS and DHL use fleets of vehicles to transport packages between drop and destination locations. Utility companies, including power and telephone companies, use a fleet of vehicles to transport technicians and equipment to install, repair and maintain services for customers.

Any company that relies on a fleet of vehicles to render its services can benefit greatly if the vehicles in its fleet can be managed efficiently. Managing a fleet of vehicles efficiently requires that the management system obtain information on the status of each vehicle in the fleet. Information related to the status of a vehicle, as explained in the '368 Application, includes location, speed, time stationary, distance traveled and other status indicators.

This status information can be forwarded to a processing center, which uses the status information to better route vehicles in the fleet to meet service demands. For example, vehicle schedules can be generated to route vehicles to destinations according to a logical dispatch scheme. The status information is monitored during the lifetime of the vehicle or as often as required to meet a specific application. Occurrences termed "events" trigger recording and transmission of status information. Events include vehicle movement, ignition on/off, vehicle speed, vehicle stopping and other events. There can be up to 160 or 180 events collected per vehicle per day. Events are described in more detail in the '368 Application.

Status information collected by the vehicle in response to an event is forwarded over a wireless transmission network to a processing center for processing. Transmission networks for sending this data include wireless data systems, cellular systems and satellite systems. For cost reasons, wireless data systems are generally preferred. Using a wireless data system, the status information can be sent cost-effectively in real-time or near real-time. However, conventional wireless data systems are generally limited in terms of their coverage area and capacity. Often, therefore, wireless data systems cannot fully service large companies' status information transmission needs.

Satellite and cellular telephone systems generally provide greater coverage areas than wireless data systems. However, the costs associated with satellite and cellular telephone systems to transmit status information collected by vehicles in a companies' vehicle fleet is generally economically unfeasible. For example, consider a company fleet having 10,000 vehicles. In this example, the companies' fleet management system records status information each time the vehicle travels a half mile or each time a vehicle travels for a duration of five minutes. That is, in this exemplary system, travel distance of a half mile and travel duration of five minutes are events. In a cellular telephone network-based system, a cellular telephone is made to send the collected status information to the processing center for each occurrence of these events for each of the 10,000 vehicles in the fleet. Sending all of this data to the processing center on a real-time or near real-time basis for each of the 160 to 180 events occurring in each of the 10,000 vehicles in the fleet would, in all likelihood, require a full day of cellular air charges. Such charges generally are uneconomical due to the high cost of cellular air time.

SUMMARY OF THE INVENTION

The present invention solves the foregoing problems and limitations associated with conventional fleet management systems by placing a multi-mode in-vehicle control unit (ICU) in one or more vehicles in a company's fleet. A multi-mode ICU has a plurality of modems. Each of the plurality of modems allows the ICU to transmit vehicle data to the processing center using a different transmission network. For example, if a multi-mode ICU has a wireless data modem and a cellular modem, the multi-mode ICU can send the vehicle data over a wireless data network or a cellular telephone network.

Selection means are included in the multi-mode ICU to select between the plurality of modems, thereby selecting the transmission network over which to transmit the vehicle data. Preferably, the selection means are priority-based. For example, consider a multi-mode ICU having a wireless data modem for transmitting vehicle data over a wireless data network and a cellular telephone module for transmitting the vehicle data over a cellular telephone network. As described above, the wireless data network is preferred for cost reasons. Consequently, the wireless data modem is assigned a higher priority than the cellular telephone module for transmitting vehicle data to the processing center. Thus, when sending vehicle data, the multi-mode ICU first attempts to transmit the vehicle data over the wireless data network using the wireless data modem. If the wireless data network is not available, the multi-mode ICU attempts to transmit the vehicle data over the cellular telephone network using the cellular telephone module.

Vehicle data to be sent over the cellular telephone network can also be stored for later transmission so that it can be sent in a batch mode. This allows the vehicle data to be sent at a time when the cost to use a transmission network is less expensive. For example, cellular telephone network air costs are reduced at night. Consequently, if vehicle data must be sent using the cellular telephone network, preferably it is stored, and later transmitted in an overnight a batch transmission. Since cellular telephone network charges are reduced at night, transmitting the vehicle data overnight in a batch transmission can be cost effective.

In one embodiment, the present invention is a multi-mode in-vehicle control unit in a vehicle comprising a first modem that can send vehicle data collected from the vehicle over a first transmission network, a second modem that can send the vehicle data over a second transmission network and selection means to determine whether to send the vehicle data over the first transmission network or over the second transmission network in accordance with a selection parameter. The selection means can make its determination according to priority assigned to the transmission networks and/or the modems.

In another embodiment, the present invention is a system for managing a fleet of vehicles, each of the vehicles having an in-vehicle control unit. The in-vehicle control unit in one or more of the vehicles comprises a first modem that can send vehicle data collected from the vehicle over a first transmission network, a second modem that can send the vehicle data over a second transmission network and selection means to determine whether to send the vehicle data over the first transmission network or the second transmission network in accordance with a selection parameter. The selection means in each in-vehicle control unit can make its determination according to priority assigned to the transmission networks and/or modems.

In another embodiment, the present invention is a method for sending vehicle data from a multi-mode in-vehicle control unit to a processing center. The method comprises the steps of collecting the vehicle data and determining whether to transmit the vehicle data to a processing center over a first transmission network using a first modem or a second transmission network using a second modem. This is called "least cost routing." Based on the determination, the method continues by transmitting the data to the processing center over the first transmission network using the first modem if the determining step determines that the vehicle data should be transmitted over the first transmission network, and transmitting the data to the processing center over the second transmission network using the second modem if the determining step determines that the vehicle data should be transmitted over the second transmission network. The determination of which modem and/or transmission network to use can be made on the basis of priorities assigned to the modems and transmission networks.

The present invention is described in greater detail in the detailed description of the invention, the appended drawings and the attached claims.

DETAILED DESCRIPTION OF THE INVENTION

The present invention is directed to a system and method for transmitting vehicle data for any or all of the vehicles in a fleet of vehicles to a processing center. The vehicle data can be data related to the status of the vehicle, including for example, vehicle speed, vehicle location, time a vehicle spends at a location, time vehicle is moving, time of ignition and other vehicle status data. The vehicle data can also be data related to an emergency. For example, the vehicle data can be an indication or notification that a user has pressed an emergency alert button as described in the '368 Application.

Figure 1:
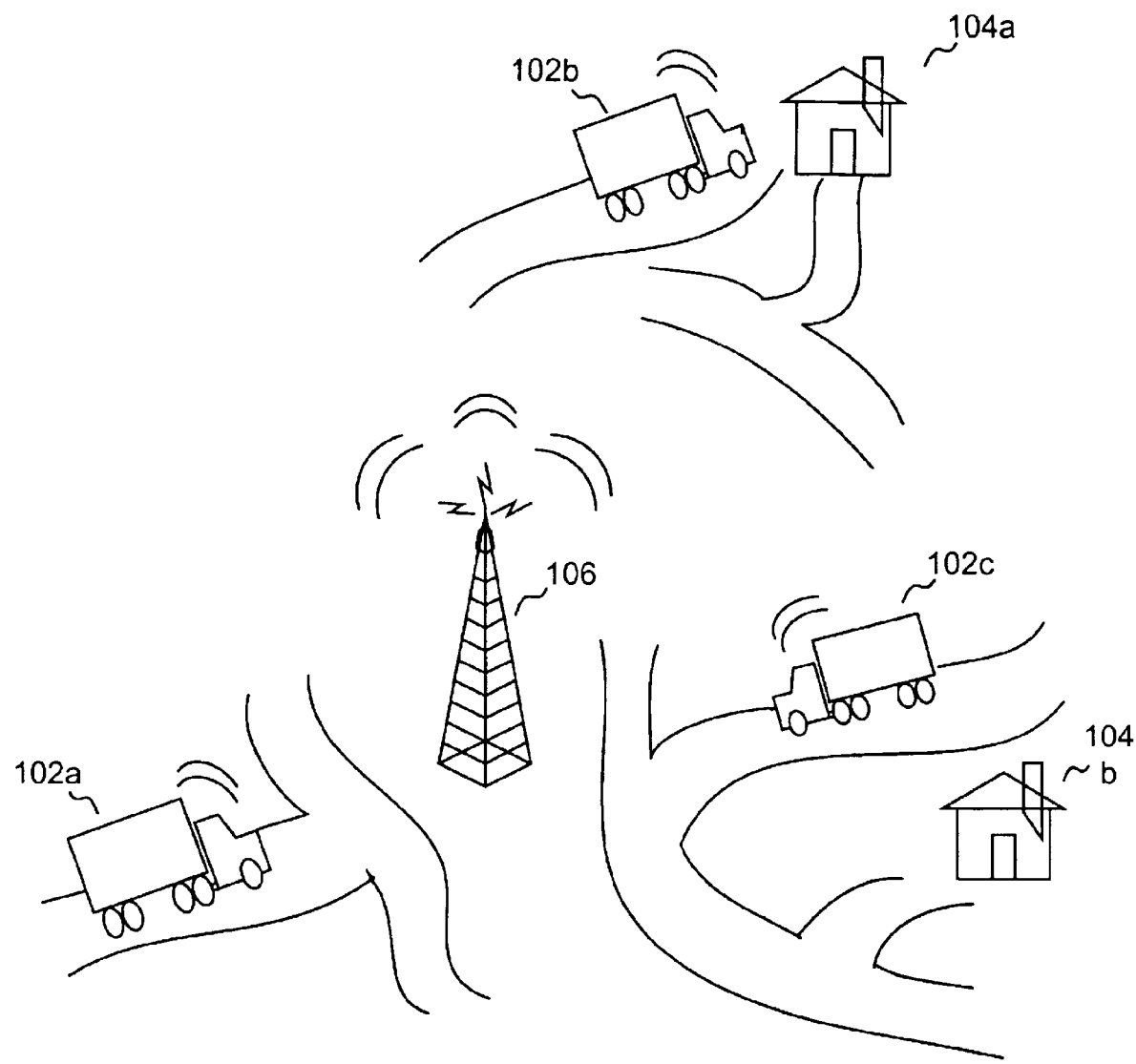
FIG. 1 is a schematic diagram of an exemplary environment for practicing the present invention.

As described above, a variety of companies rely on fleets of vehicles in their normal operations. FIG. 1 is a schematic diagram illustrating an exemplary environment for implementing the present invention. Vehicles 102a, 102b and 102c are vehicles in a company's fleet. Vehicle 102b is stationary and located a customer 104a's location. Vehicle 102c has been dispatched to customer location 104b. Using the present invention, the company is able to monitor and collect vehicle data for vehicles 102a, 102b and 102c. The vehicle data is transmitted by an in-vehicle control unit (ICU) housed in each of the vehicles to a processing center 106. The processing center uses the transmitted vehicle data to manage the fleet of vehicles as described in the '368 Application. While only three vehicles are illustrated in the exemplary environment of FIG. 1, it would be apparent to those skilled in the art that the present invention is scalable to any number of vehicles that may be in the company's fleet.

Vehicles 102a, 102b and 102c have monitoring capabilities for receiving and generating vehicle data. Every ICU in the system can send vehicle data to a processing center 106 where it is used for fleet management. Preferably, all of these functions are performed and controlled by an in-vehicle control unit (ICU). ICU 200 is preferably located either underneath the front passenger seat or attached to the back of the front passenger seat.

Figure 2:
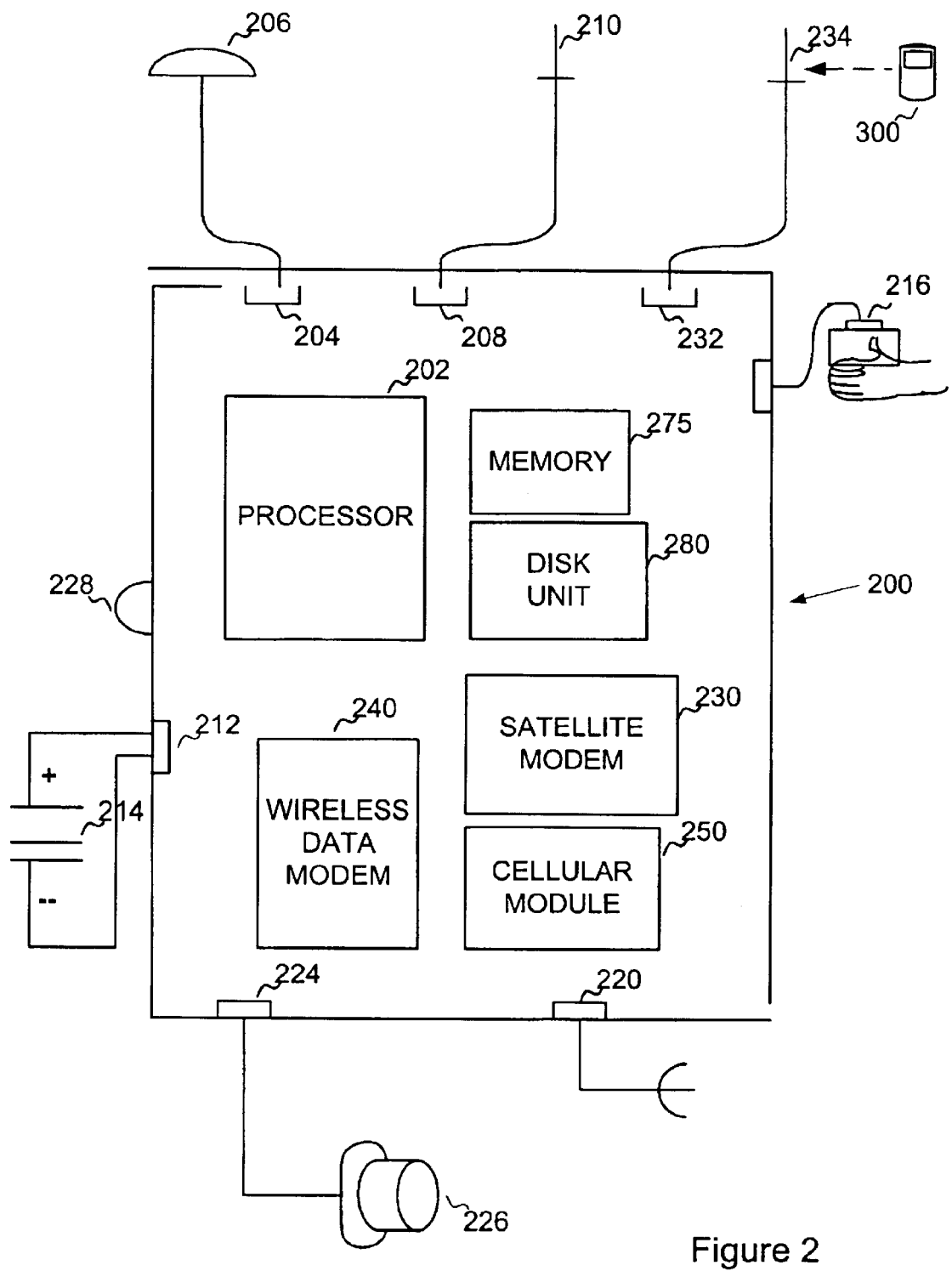
FIG. 2 is a multi-mode ICU according to an embodiment of the present invention.

One or more of the vehicles in the company's fleet contain a multi-mode ICU that enables communication using a wireless data network, a cellular telephone network or a satellite network. FIG. 2 is a schematic diagram of a multi-mode ICU 200. Multi-mode ICU 200 includes a plurality of connections to enable it to perform its designed functions. A connection 208 is adapted to receive an antenna 210. A connection 204 is to communicate with a global positioning system (GPS) receiver 206. A connection 212 accepts power from a motor vehicle battery 214. An ignition sensor 216 communicates with multi-mode ICU 200 via a connection 218. Ignition sensor 216 determines if an ignition on event or an ignition off event has occurred. There is also, preferably, a handset connection 220 for a cellular telephone handset 222. Multi-mode ICU 200 also includes an alert call connection 224 that receives the input of an in-vehicle alert call button 226. Multi-mode ICU 200 has a security tag 228 that is tamper-evident.

Multi-mode ICU 200 also has components that perform computing and communications tasks. In addition to a processor 202, multi-mode ICU 200 can optionally have at least one or more of the following components: a satellite modem 230, a wireless data modem 240, a cellular module 250, and/or a GPS receiver 206. Multi-mode ICU 200 also preferably includes a memory 275 accessible by processor 202. Memory 275 can also be used for long term storage of event data. Alternately, a mass storage device, such as a disk storage unit 280 is provided for long term storage of event data. Disk storage unit 280 can be located external to multi-mode ICU 200, but is preferably internal to multi-mode ICU 200. Multi-mode ICU 200 also includes an antenna connection 232 for an RF antenna 234 to receive signals from a remote alert transmitter 300. Preferably, the processor 202 is an Intel x386 based processor (or later processor), and GPS receiver 206 is a 12-channel receiver. Cellular module 250 includes a cellular modem and a cellular telephone system. Preferably, multi-mode ICU 200 includes every communications component for which service is available in the particular area where multi-mode ICU 200 is used. In an exemplary embodiment of the invention, multi-mode ICU 200 includes all of the communications components.

Multi-mode ICU 200 selects which mode (transmission network) to use for transmitting vehicle data using a selection parameter. Preferably, the selection parameter is dynamic. That is, the selection parameter is dependent upon the current operating conditions at the time the vehicle data is to be transmitted. The selection parameter can be based on any desired criterion or criteria. For example, a mode can be selected based on time of day, day of week, assigned priority, vehicle identification, vehicle operator identification, vehicle base station, company department or any other criterion or criteria.

The assigned priority, if used, includes any combination of vehicle identification, vehicle operator identification or availability, vehicle base station, company department, emergency, job status or any other desired priority metric. Priorities based on emergency include vehicle operator distress, such as might be signaled by the remote alert button described in the '368 Application, vehicle identification, vehicle operator identification, vehicle location, vehicle time stationary, or any other desired emergency-based priority.

Preferably, data is transmitted over a wireless data network via wireless data modem 240. Transmission over a wireless data network is preferred because it is more cost-effective than transmission over cellular telephone networks or satellite networks. This cost effectiveness allows continuous use of the wireless data network. Thus, vehicle data can be sent to processing center 106 as it is collected. That is, using a wireless data network, the vehicle data can be sent to processing center 106 in real-time or near real-time. Events that can be monitored are described in the '368 Application.

Vehicle data that is collected for transmission to processing center 106 is packetized prior to transmission. In one embodiment of the present invention, vehicle data sufficient to fill at least one packet is required prior to sending any vehicle data to processing center 106. In an alternate embodiment of the present invention, vehicle data is sent immediately as data corresponding to each event is collected, whether sufficient data to fill at least one packet has been received or not. The advantage of the former method is efficient use of network resources, for example, reduced network traffic. The latter method allows for real-time reporting of the events, but at the expense of increased network traffic. The packets are received by processing center 106 and stored therein for subsequent processing. In either case, filler data, such as zeroes or negative ones, is used to fill any partially filled packets prior to sending the vehicle data.

Conventional wireless data service providers are generally limited in capacity and coverage area. These limitations mean that wireless data networks often cannot handle all of a large fleet's vehicle data transmissions. For example, a wireless data service might be able to guarantee capacity for only 85 percent of the status data generated by a company's fleet. Thus, 15 percent of the company's fleet is not covered. Thus, the company must find alternative communication networks for transmitting the vehicle data, or risk inefficient management of its fleet. In an age where customer service and company responsiveness is increasingly important to corporate survival, forgoing opportunities to improve operational efficiency is generally unacceptable.

Consequently, other transmission networks must be considered to handle overflow traffic, i.e., traffic that the wireless data network cannot handle. Two such transmission networks are satellite networks and cellular telephone networks. Cellular module 250 is used to transmit data over a cellular telephone network. Satellite modem 230 is used to transmit vehicle data over a satellite network. Generally, satellite networks are very expensive. Consequently, satellite networks are generally considered a last resort for transmission of vehicle status data in a fleet management system. However, satellite networks can provide nearly universal coverage. For example, a satellite network might be used in an emergency situation to transmit vehicle data that is emergency in nature, especially in cases where coverage is not provided by either a wireless data network or a cellular telephone network. Cellular telephone networks, while more expensive to use than wireless data networks, offer a viable alternative to wireless data networks to regularly handle overflow traffic. The costs can be reduced using storage and batch transmission of vehicle data over cellular telephone networks as described below.

There are two kinds of cellular telephone networks, digital and analog. The analog cellular telephone network is the well known AMPS system. While either digital or analog cellular service can be used, analog service is preferred. This is because (a) analog is cheaper to use, and (b) using analog cellular service avoids billing complexities associated with the numerous providers of digital cellular service.

As described above, the use of a cellular telephone network to transmit the data is expensive due to the high cost of cellular air time. This expense can be reduced by storing vehicle data in a file for transmission at a later time, when the cost of using a cellular telephone network is less expensive. The vehicle data is preferably stored in memory 275 or on disk unit 280. At some later time, the stored vehicle data is extracted from memory 275 or disk unit 280 (depending on where it was stored) and sent to processing center 106.

In practice, only a portion of the fleet needs to be fitted with multi-mode ICUs. For example, if the high priority transmission network (e.g., the wireless data network) has capacity for 85 percent of the fleet, then only that 15 percent of the fleet need be fitted with multi-mode ICUs. In this case, only 15 percent of the fleet equipped with a multi-mode ICU is able to transmit vehicle data over alternative transmission networks. Because single-mode ICUs are less expensive than multi-mode ICUs, limiting the number of multi-mode ICUs supporting a fleet to only a percentage of vehicles that are not covered by the highest transmission network can result in significant cost savings to the company.

Usage conflict can occur when the highest priority transmission network is fully loaded with vehicle data transmissions, and one or more of the ICUs using the primary transmission network are multi-mode ICUs. The conflict is that a single-mode ICU, which can only use the highest priority transmission network, cannot send vehicle data.

One way to address the conflict is for the single-mode ICU to log the vehicle data for later transmission when capacity on the highest priority transmission network is available. Another way to address the conflict is to allow the single-mode transmission ICU to bump the multi-mode transmission. Bumping refers to terminating an in-progress transmission and substituting the bumping ICUs transmission. The system coordinates such bumping so that prior to being bumped, the multi-mode ICU is switched to an alternative transmission network so that it can continue to send its vehicle data. After the multi-mode ICU switches to the other network, the single-mode ICU begins transmitting its vehicle data. If there is no network available for the multi-mode ICU to switch to, it is not bumped, and the single-mode ICU logs its vehicle data to a memory. In an alternative embodiment of the present invention, the multi-mode ICU is bumped regardless of whether there is an alternative transmission network available to transmit the vehicle data. Upon being bumped, it begins logging vehicle data to a memory.

Emergency transmissions always have priority. Consequently, emergency transmission are transmitted even if the transmission requires bumping another transmission already in progress. Likewise, an ICU engaged in an emergency transmission cannot be bumped during that transmission.

If a vehicle having a single-mode ICU is dispatched to an area where there is no transmission network coverage for the single mode, events are logged and stored in a memory located in the ICU or on the vehicle. Subsequently, when the vehicle enters an area for which coverage is provided by the single mode transmission system, the ICU of the vehicle transmits the stored data from the memory to the processing center. In this case, however, the data is not generally real time.

The multi-mode ICU of the present invention is also equipped with a dynamic update system. If the software that controls the multi-mode ICU is modified, the modified software can be uploaded to the multi-mode ICU. Once received, the modified software replaces the old software. The multi-mode ICU thereafter operates according to the modified software.

Figure 3:
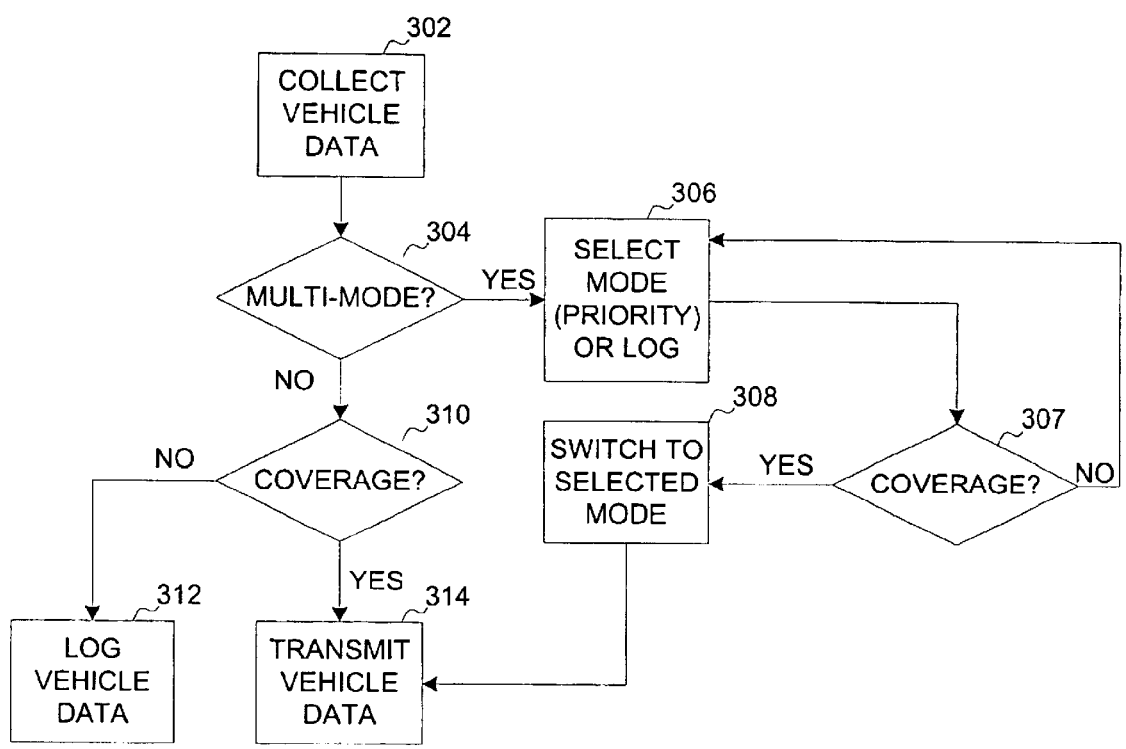
FIG. 3 is a flow chart for a method for transmitting vehicle data from a multi-mode ICU to a processing center according to an embodiment of the present invention.

FIG. 3 is a flow chart for a method for carrying out the present invention. The steps of the method are preferably performed by processor 202 in conjunction with memory 275 and disk storage unit 280. In step 302 vehicle data is collected. As described above, the vehicle data is collected in response to a triggering event. In step 304, processor 202 determines whether the ICU is a multi-mode ICU or a single-mode ICU. If the ICU is a multi-mode ICU, processing continues in step 306 where processor 202 selects a transmission mode for transmitting the vehicle data. Transmission mode selection is preferably accomplished by choosing a modem and/or transmission network over which to transmit the vehicle data. Preferably, the selection of the transmission mode is priority-based. For example, if wireless data has a higher priority than cellular data, processor 202 selects wireless data modem 240. In step 307 processor 202 determines whether there is coverage for the selected transmission mode. If there is no coverage, processor 202 returns to step 306 where it selects another transmission mode. Selection of the transmission mode in step 306 is also based on priority. Processor 202 continues in step 306 until a suitable transmission mode is found. If no such transmission mode is found, processor 202 switches multi-mode ICU 200 into a logging state. In the logging state, multi-mode ICU 200 logs the status data for later transmission. In step 308 processor 202 causes multi-mode ICU 200 to switch to the transmission mode selected in step 306. No switching is required if multi-mode ICU 200 is already configured to use the transmission mode selected in step 306. Multi-mode ICU 200 then transmits the data in step 314.

If processor 202 determines that the ICU is a single mode ICU in step 304, processor 202 determines whether there is coverage for the transmission network. If there is no coverage, processor 202 continues in step 312 where it logs the status data for later transmission. If there is coverage, ICU transmits the status data in step 314.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for managing a fleet of vehicles, comprising:
    placing an in-vehicle control unit (ICU) in every unit in the fleet of vehicles, wherein at least one of the ICUs is a multi-mode ICU;
    determining a percentage of the vehicles in the fleet that is not covered by a particular transmission network;
    placing multi-mode ICUs only in a number of vehicles in the fleet corresponding to the percentage of the vehicles in the fleet not covered by the particular transmission network;
    collecting vehicle data for each vehicle in the fleet;
    transmitting the vehicle data to a processing center; and
    analyzing the vehicle data to generate routing schedules to route the vehicles in the fleet.

2. The method recited in claim 1, further comprising:
    determining whether to transmit the vehicle data to a processing center over a first transmission network or a second transmission network in accordance with the selection parameter according to a priority;
    transmitting the data to the processing center over the first transmission network using a first modem if the vehicle data is to be transmitted over the first transmission network; and
    transmitting the data to the processing center over the second transmission network using a second modem if the vehicle data is to be transmitted over the second transmission network.

3. The method recited in claim 1, further comprising logging vehicle data that cannot be transmitted to the processing center in real-time or near real-time.

4. The method recited in claim 1, further comprising logging vehicle data that cannot be transmitted over a highest priority transmission network.

5. The method recited in claim 1, further comprising:
    logging the vehicle data; and
    thereafter, initiating data transmission of the vehicle data of the first vehicle over the first transmission network.

6. A method for managing vehicle data transmission in a fleet of vehicles including a first vehicle containing a single mode in-vehicle control unit (ICU) and a second vehicle containing a multi-mode ICU wherein the second vehicle is in communication over a first transmission network comprising:
    determining that the first vehicle has a need to communicate over the first transmission network using the ICU;

determining that the first transmission network is fully loaded;

determining whether a bumping criterion is met; and bumping the second vehicle from transmitting over the second communication network when the bumping criterion is met to allow the first vehicle to communicate over the first transmission network in place of the second vehicle.

7. The method recited in claim 6, wherein the first transmission network is a highest priority network.

8. The method recited in claim 6, wherein the bumping criterion comprises the presence of an alternative transmission network available to transmit the vehicle data of the second vehicle prior to its being bumped, further comprising establishing communication for the second vehicle over the alternative transmission network.

9. The method recited in claim 6, further comprising:

initiating data transmission corresponding to vehicle data for the second vehicle over a second transmission network; and selection means to determine whether to send the collected vehicle data using the highest priority transmission network or the second transmission network in accordance with a selection parameter; and means for managing the fleet of vehicles using the collected vehicle data wherein the means for managing the fleet of vehicles comprises means for resolving conflicts in transmission network usage, wherein the number of vehicles having a single mode ICU is determined in accordance with a capacity of the highest priority network for transmission of fleet data.

10. The method recited in claim 6, further comprising:

determining there is no alternative transmission network over which to transmit vehicle data for the second vehicle at the time of the bumping; and logging vehicle data corresponding to the second vehicle into a memory after the second vehicle's data transmission is bumped.

11. The method recited in claim 6, wherein the communication for the first vehicle is related to an emergency.

12. The method recited in claim 6, wherein the data transmission of the second vehicle is other than a transmission of emergency data.

13. A system for managing data in a fleet of vehicles having a plurality of vehicles, the fleet including at least one vehicle having a single mode in-vehicle control unit (ICU) for transmission of vehicle data over a highest priority network and at least one vehicle having a multi-mode ICU for transmission of vehicle data over a plurality of networks including the highest priority network, wherein the multi-mode ICU comprises:

a first communication device to send vehicle data collected from a vehicle having the multi-mode ICU over the highest priority transmission network;

a second communication device to send the collected vehicle data over a second transmission network;

transmitting the logged vehicle data at a later time when costs are reduced.

14. The system recited in claim 13, wherein the means for resolving conflicts in transmission network usage comprises means for resolving transmission network usage conflicts wherein transmission of the collected vehicle data would otherwise overburden one or both of the first and second transmission networks.

15. The system recited in claim 14, wherein the means for resolving transmission network usage conflicts comprises bumping an in progress transmission of vehicle data collected by another of the vehicles in the fleet of vehicles.

16. A method for minimizing costs of transmitting vehicle data comprising:

determining a percentage of the vehicles in a fleet of vehicles that is not covered by a particular transmission network;

placing multi-mode in-vehicle control units only in a number of vehicles in the fleet corresponding to the percentage of the vehicles in the fleet that is not covered by the particular transmission network, wherein the multi-mode in-vehicle control unit (ICU) can transmit the data over one of a plurality of transmission networks;

collecting data concerning a first vehicle; and transmitting the data from the first vehicle to a processing center over one of the plurality of transmission networks.

17. The method recited in claim 16, further comprising:

bumping a transmission already in progress from the first vehicle over one of the plurality of transmission networks with a higher priority transmission from a second vehicle; and storing vehicle data associated with the bumped transmission in a memory so that the vehicle data associated with the bumped transmission can be sent at a later time.

18. The method recited in claim 17, further comprising transmitting the vehicle data stored in the memory at a time when a cost associated with transmitting the vehicle data is reduced.

19. The method recited in claim 17, wherein the one of the plurality of transmission networks is the particular network, wherein the particular network is a lowest cost network.

20. The method recited in claim 19, wherein the cost associated with transmitting the vehicle data from the first vehicle is reduced by transmitting the data over the particular network when the particular network is not fully loaded.

21. The method of claim 19, wherein the first vehicle contains a multi-mode ICU, and wherein the cost associated with transmitting the vehicle data from the first vehicle is reduced by transmitting the data over an alternative network during a reduced cost period for the alternative network.

* * * * *

UNITED STATES PATENT AND TRADEMARK OFFICE
CERTIFICATE OF CORRECTION

PATENT NO. : 6,839,614 B1  
DATED : January 4, 2005  
INVENTOR(S) : Timko et al.

It is certified that error appears in the above-identified patent and that said Letters Patent is hereby corrected as shown below:

Column 2,  
Line 59, "overnight a batch" should read -- overnight batch --.

Column 8,  
Lines 55-58, should read:  
5. The method recited in claim 1, further comprising:  
logging the vehicle data; and  
transmitting the logged vehicle data at a later time when  
   costs are reduced.

Column 9,  
Lines 17-32, should read:  
9. The method recited in claim 6, further comprising:  
initiating data transmission corresponding to vehicle data  
   for the second vehicle over a second transmission  
   network; and  
thereafter, initiating data transmission of the vehicle data  
   of the first vehicle over the first transmission network.

Column 9, line 45 - Column 10, line 2,  
should read:

13. A system for managing data in a fleet of vehicles having a plurality of vehicles, the fleet including at least one vehicle having a single mode in-vehicle control unit (ICU) for transmission of vehicle data over a highest priority network and at least one vehicle having a multi-mode ICU for transmission of vehicle data over a plurality of networks including the highest priority network, wherein the multi-mode ICU comprises:  
      a first communication device to send vehicle data collected from a vehicle having the multi-mode ICU over the highest priority transmission network;  
      a second communication device to send the collected vehicle data over a second transmission network;  
      selection means to determine whether to send the collected vehicle data using the highest priority transmission network in accordance with a selection parameter; and  
      means for managing the fleet of vehicles using the collected vehicle data wherein the means for managing the fleet of

UNITED STATES PATENT AND TRADEMARK OFFICE
CERTIFICATE OF CORRECTION

PATENT NO.     : 6,839,614 B1
DATED          : January 4, 2005
INVENTOR(S)    : Timko et al.

It is certified that error appears in the above-identified patent and that said Letters Patent is hereby corrected as shown below:

Column 9, line 45 - Column 10, line 2 (cont'd),
vehicles comprises means for resolving conflicts in transmission network usage, wherein the number of vehicles having a single mode ICU is determined in accordance with a capacity of the highest priority network for transmission of fleet data.

Signed and Sealed this

Sixteenth Day of August, 2005

JON W. DUDAS
*Director of the United States Patent and Trademark Office*